United States Patent Office 3,495,435
Patented Feb. 17, 1970

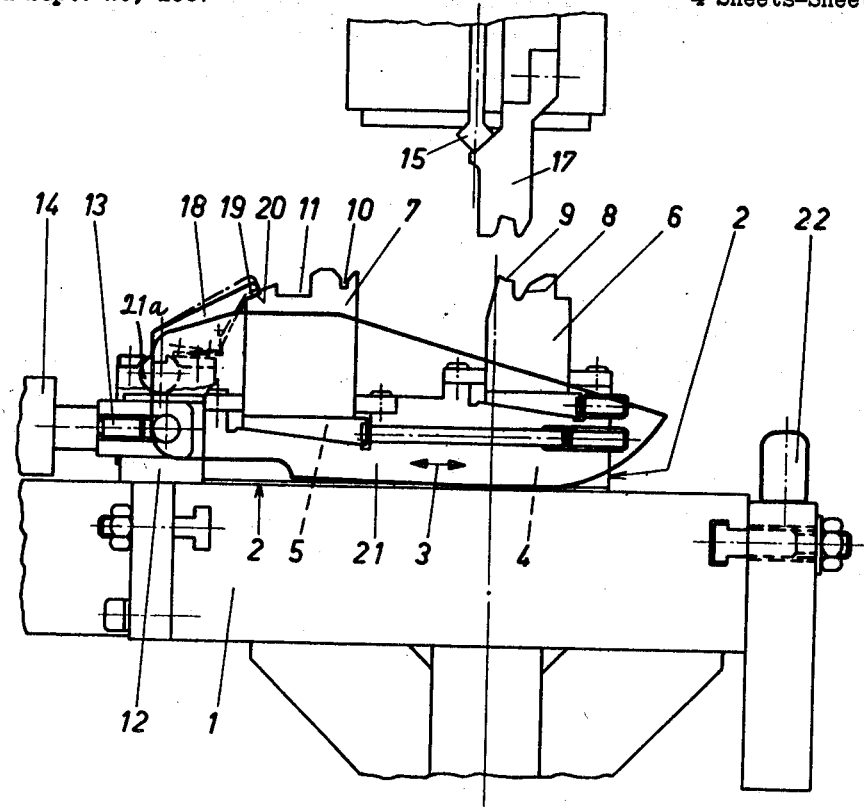
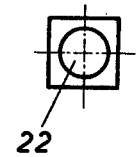
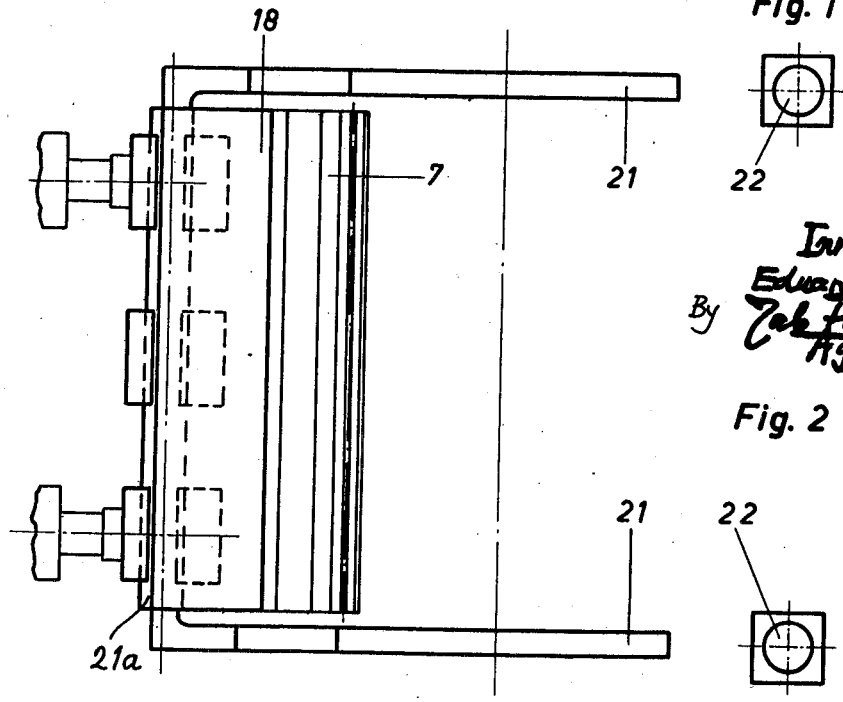
Fig. 1
Fig. 2

3,495,435
METAL BENDERS
Eduard Hänni, Rosengartenstrasse 10,
Zofingen, Switzerland
Filed Sept. 20, 1967, Ser. No. 669,016
Int. Cl. B21d *11/20*
U.S. Cl. 72—448                        5 Claims

ABSTRACT OF THE DISCLOSURE

A metal bender incorporating a work table having a reciprocable carriage tool holder and carrying two dies, a support bar cooperating with one of the two dies, and being automatically moved to a position above the die when the carriage moves to a predetermined position, whereby a sheet-metal workpiece can be introduced between the die and the bar for bending, on the one hand, and a ram, die and work tools located above the carriage, on the other hand for cooperating with the dies on the carriage.

BACKGROUND OF THE INVENTION

The invention pertains to metal benders having a movable ram and a work table, individual work tool holders mounted on the ram and on the work table, each tool holder having various work tools for bending that can be moved from a stand-by position into a working or service position, the work tool holder on the work table being in the form of a reciprocable carriage. Benders of this kind are suitable for carrying out bending operations in accordance with a pre-set program, because different work tools can be easily and quickly brought into service, and even automatically controlled by a program.

The present invention relates to an improvement in benders of the above type, which form a doubled over bend, that is, one in which the two sides are pressed flat together. To produce such bends, a V-bend is made employing a suitable work tool. The V-bend must then be pressed flat by a special work tool. With known benders of the kind described above, the V-bend cannot be pressed flat.

SUMMARY

In accordance with the invention, the problem of being unable to press the sides of the bend flat together is solved by employing at least one support bar that is pivotable between a stand-by position and a working position. In the latter position the bar cooperates with one of the two work tools of the carriage tool holder. The invention further employs at least one control means located in the path of the carriage tool holder and which controls the position of the support bar.

BRIEF DESCRIPTION OF THE DRAWING

In the accompanying drawings:
FIG. 1 is a somewhat schematic side view of the improved metal bender according to the invention;
FIG. 2 is a top view thereof.

DESCRIPTION OF A PREFERRED EMBODIMENT

Figure 3:
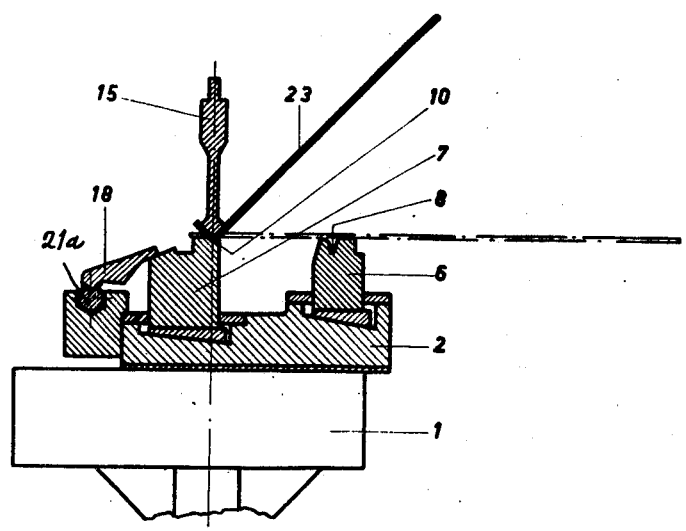
FIGS. 3–8 schematically show a series of bending operations carried out with the inventive device.
Figure 4:
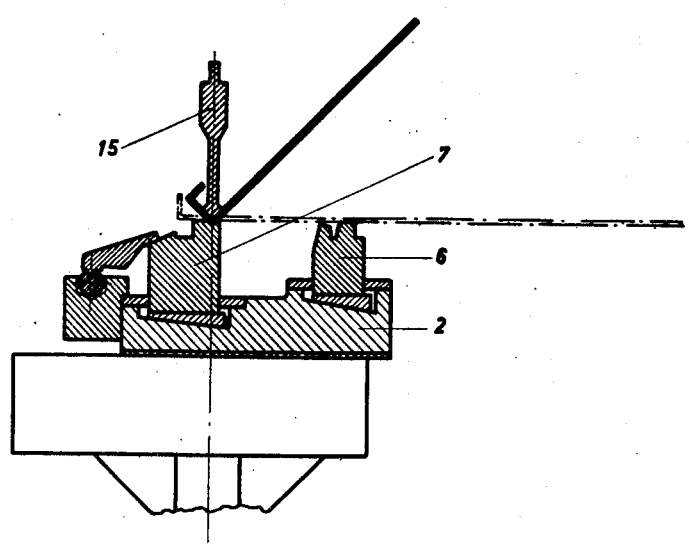

With reference to FIGS. 1 and 2, the inventive metal bender incorporates a work table 1 which supports a carriage tool holder 2 that is free to reciprocate horizontally in the direction of the double-headed arrow 3. The tool holder 2 comprises a centering plate 4. Two spaced work tools in the form of bottom dies 6 and 7 are secured to the tool holder 2 by means of adjustable curved parts 5. Die 7 and some other structural elements have been omitted from FIG. 2 for the sake of clarity.

The die 6 incorporates work surfaces 8 and 9, and die 7 has work surfaces 10 and 11. The centering plate 4 is connected by a fork-shaped holder 12 to a piston rod 13 of a piston (not shown) located in an operating cylinder 14. Movement of the piston causes the centering plate 4 together with the dies 6 and 7 to move to and fro.

Above the work table 1 is located a vertically movable die arranged in a ram and having a plurality of work tools 15, 16 and 17 (see FIG. 6) that can selectively be put into service, as described in Austrian Patent No. 264,969 of Dec. 22, 1965, issued to Haemmerle A. G., Zofingen, Switzerland.

A supplementary support bar 18, located near the die 7, is so pivotally mounted on the tool holder that, in the position shown in full line, the work surface 19 of the bar 18 rests on a shoulder 20 of the die 7, whereas in the position shown in broken line there is a gap between the work surface 19 and the shoulder 20.

In accordance with the invention, a plurality of dies 7 can be located side by side on the tool holder 2, and a plurality of supplementary support bars 18 is provided.

A control arm 21 is located on each side of the carriage tool holder 2. The arms 21 extend in the direction of the tool holder, and the support bar 18 pivots with the arms 21. A resiliently yielding stop 22, acting as a cam, is located at the end of the path of movement of each control arm 21, so that when the arms 21 come to rest against the stops 22, the arms 21 and thus the support bar 18 are caused to pivot upwards.

If in this working position a work tool 15, 16 or 17 cooperating with the shoulder 20 is put into service, the support bar 18 and its work surface 19 are pressed towards the shoulder 20, whereby the elastically yielding stops 22 and the ends of the control arms 21 are forced downwards. The control arms 21 and the support bar 18 can be mounted on a common shaft, as shown at 21a. Instead of a single bar 18, two or more bars or bar sections may be provided (not shown).

FIGS. 3–8 illustrate how the bending operators are performed. A workpiece 23 (sheet iron, for example) rests on the dies 6 and 7, and first of all will be repeatedly bent by the work tool 15 on the work surface 10, and subsequently folded on the work surface 8 of the die 6. The support arm 18 is not used in this series of forming operations.

Figure 5:
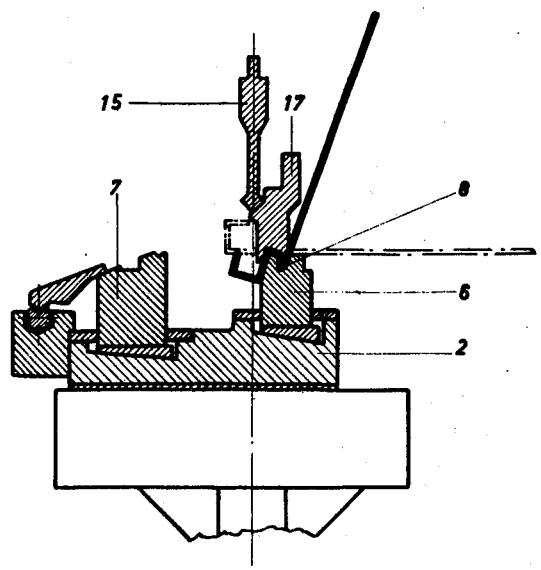

As shown in FIG. 5, a V-shaped fold is formed by the tool 17 on the work surface 8. The V-shaped fold is pressed together by the tool 16 on the die 7 (see FIG. 6), the tool holder 2 and dies 6 and 7 having been previously shifted to the right as seen in FIG. 1.

Figure 6:
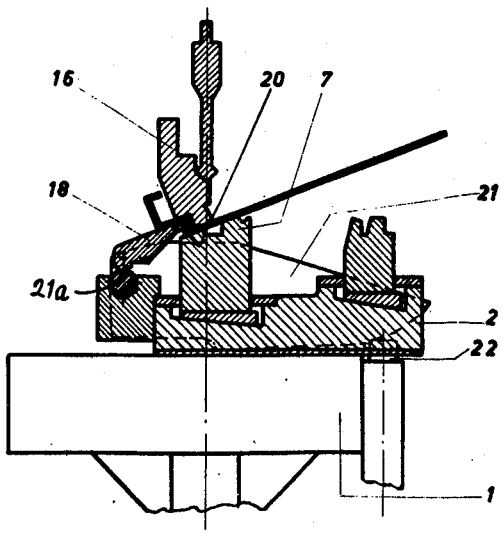

As a result, the control arms 21 come to rest on the stops 22, causing the support arm 18 to pivot to the position shown in FIG. 6. When the work tool 16 is lowered, the arm 18 is forced towards the shoulder 20 of the die 7, pressing together the V-shaped fold.

Figure 7:
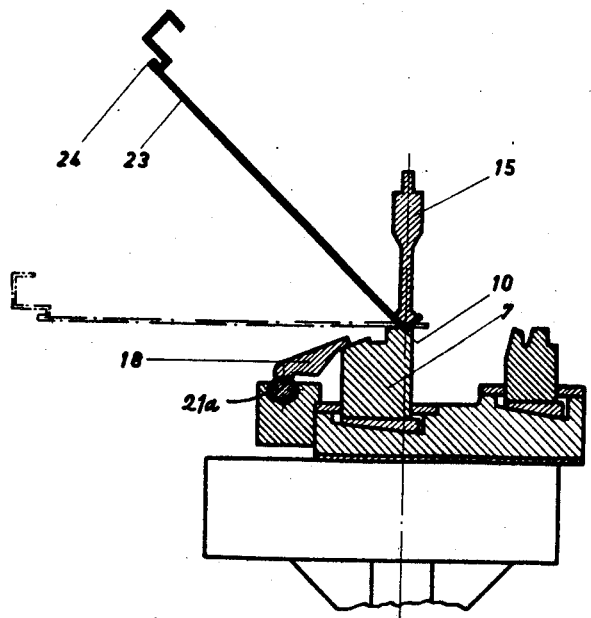
Figure 8:
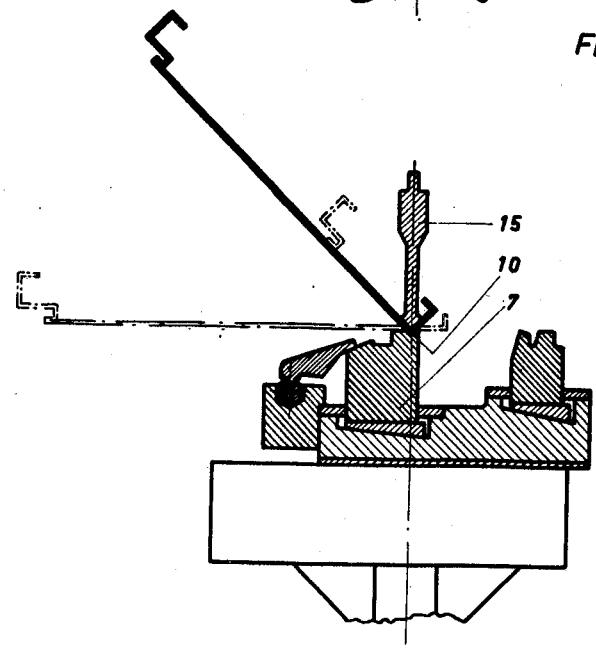

The resulting fold is shown in FIG. 7 and indicated by the reference numeral 24. The concluding bending operations, employing the work surface 10 of die 7, are illustrated in FIGS. 7 and 8.

I claim:
1. In a metal bender having a movable ram and a work table, individual first and second work tool holders mounted respectively on said ram and said work table, said tool holders having various work tools for bending workpieces, that can be moved from a stand-by position into a working position, and said second tool holder being a movable carriage that defines a path of movement, wherein the improvement comprises at least one support bar pivotable between a stand-by position and a working position, in which latter it cooperates with one of said tools of said second tool holder to form a doubled-over bend in the workpieces, and at least one control means located in said path of movement, for controlling said support bar.

2. The improvement in a metal bender as defined in claim 1, further comprising at least one pivotally mounted control arm that extends in the direction of and is mounted on said second tool holder, said control arm and said support bar being interconnected so that movement of the former is transmitted to the latter, the position of said control arm being determined by said control means when said second tool holder is in a predetermined position.

3. The improvement in a metal bender as defined in claim 2, further comprising a common shaft for mounting said support bar and said control arm, whereby pivoting of the latter causes a corresponding pivoting of the former.

4. The improvement in a metal bender as defined in claim 3, wherein said control means is a resiliently yielding cam located so that in the predetermined position of said second tool holder the end of said control arm remote from said support bar comes to rest on said control means, thereby causing said control arm and thus said support bar to pivot.

5. The improvement in a metal bender as defined in claim 1, further comprising at least one control arm extending in the direction of said second tool holder, said control arm moving with said second tool holder and being pivotally mounted thereon, said support bar normally resting on a surface of said one tool and being connected to one end of said control arm at the pivot point thereof, said control means being a resiliently yieldable stop acting as a cam and so located that the end of said control arm remote from said support bar is supported by said stop when said second tool holder is in a predetermined position, whereby said control arm and thereby said support bar are pivoted upwards so that a gap is opened between said support bar and said surface, and whereby a workpiece which is to have a double-over bend can be introduced therebetween.

References Cited

UNITED STATES PATENTS

| | | | |
|---|---|---|---|
| 733,085 | 7/1903 | Sheldon | 72—403 |
| 1,013,871 | 1/1912 | Ellis | 72—414 |
| 2,975,701 | 3/1961 | Munschauer | 72—448 |
| 3,029,858 | 4/1962 | Harper | 72—448 |

CHARLES W. LANHAM, Primary Examiner

G. P. CROSBY, Assistant Examiner

U.S. Cl. X.R.

72—471